(12) United States Patent
Jamison et al.

(10) Patent No.: US 12,542,968 B2
(45) Date of Patent: *Feb. 3, 2026

(54) SYSTEM FOR EXTENDED WIRELESS USE OF CAMERAS AND ANCILLARY DEVICES

(71) Applicant: Panavision International, L.P., Woodland Hills, CA (US)

(72) Inventors: Richard L. Jamison, Simi Valley, CA (US); Scott Thomas MacDonald, Simi Valley, CA (US)

(73) Assignee: Panavision International, L.P., Woodland Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/092,749

(22) Filed: Jan. 3, 2023

(65) Prior Publication Data
US 2023/0232096 A1 Jul. 20, 2023

Related U.S. Application Data

(63) Continuation of application No. 16/548,716, filed on Aug. 22, 2019, now Pat. No. 11,546,498.
(Continued)

(51) Int. Cl.
*H04N 23/66* (2023.01)
*H04B 10/25* (2013.01)
*H04B 10/2575* (2013.01)

(52) U.S. Cl.
CPC ......... *H04N 23/66* (2023.01); *H04B 10/2575* (2013.01); *H04B 10/2589* (2020.05)

(58) Field of Classification Search
CPC . H04N 23/66; H04B 10/2575; H04B 10/2589
See application file for complete search history.

(56) References Cited

U.S. PATENT DOCUMENTS

| 9,011,023 B2 | 4/2015 | Wordsworth et al. |
| 11,546,498 B2 * | 1/2023 | Jamison ............... H04N 23/661 |

(Continued)

FOREIGN PATENT DOCUMENTS

| CN | 203851234 U | | 9/2014 | |
| CN | 107580156 A | * | 1/2018 | ............. H04N 5/225 |
| GB | 2422061 A | * | 7/2006 | ............. H04N 7/185 |

OTHER PUBLICATIONS

International Search Report dated Nov. 27, 2019 in corresponding International Application No. PCT/US2019/047910 filed Aug. 23, 2019; total 4 pages.
(Continued)

*Primary Examiner* — Nhan T Tran
(74) *Attorney, Agent, or Firm* — Snell & Wilmer L.L.P.

(57) ABSTRACT

Systems to extend signal transfer used with a camera device comprise a first location station with a first receiver and a second receiver. The first receiver receives wireless signals from a user device that are changed and sent through a fiber optic cable to a second location station. The second receiver receives signals through the cable from the second location station, which signals are changed to wireless signals output to a user device. The second location station comprises a third receiver that receives from the cable from the first location station, which signals are changed to wireless signals output to a camera device. The second location comprises a fourth receiver that receives wireless signals from the camera device, which signals are changed at the first location to signals sent through the cable from the second location station to the first location station.

15 Claims, 13 Drawing Sheets

Related U.S. Application Data

(60) Provisional application No. 62/722,813, filed on Aug. 24, 2018.

(56) References Cited

U.S. PATENT DOCUMENTS

| | | | |
|---|---|---|---|
| 2005/0179539 A1* | 8/2005 | Hill | G08B 13/19632 340/521 |
| 2006/0048286 A1 | 3/2006 | Donato | |
| 2006/0066725 A1 | 3/2006 | Dodrill et al. | |
| 2012/0257051 A1 | 10/2012 | Cheng et al. | |
| 2012/0297451 A1* | 11/2012 | Ozzie | H04L 63/0884 709/204 |
| 2013/0162845 A1 | 6/2013 | Wordsworth et al. | |
| 2015/0309271 A1 | 10/2015 | Huegerich et al. | |
| 2016/0127691 A1 | 5/2016 | Bokowski et al. | |

OTHER PUBLICATIONS

Written Opinion of the International Searching Authority dated Nov. 27, 2019 in corresponding International Application No. PCT/US2019/047910 filed Aug. 23, 2019; total 7 pages.

International Preliminary Report on Patentability dated Mar. 2, 2021 in corresponding International Application No. PCT/US2019/047910 filed Aug. 23, 2019; total 8 pages.

Non-Final Office Action dated Oct. 5, 2020 in corresponding U.S. Appl. No. 16/548,716, filed Aug. 22, 2019; total 10 pages.

Final Office Action dated Apr. 13, 2021 in corresponding U.S. Appl. No. 16/548,716, filed Aug. 22, 2019; total 13 pages.

Advisory Action dated Jun. 21, 2021 in corresponding U.S. Appl. No. 16/548,716, filed Aug. 22, 2019; total 3 pages.

Non-Final Office Action dated Auguust 19, 2021 in corresponding U.S. Appl. No. 16/548,716, filed Aug. 22, 2019; total 13 pages.

Final Office Action dated Apr. 12, 2022 in corresponding U.S. Appl. No. 16/548,716, filed Aug. 22, 2019; total 12 pages.

Advisory Action dated Jun. 30, 2022 in corresponding U.S. Appl. No. 16/548,716, filed Aug. 22, 2019; total 3 pages.

Notice of Allowance dated Sep. 6, 2022 in corresponding U.S. Appl. No. 16/548,716, filed Aug. 22, 2019; total 8 pages.

\* cited by examiner

SYSTEM FOR EXTENDED WIRELESS USE OF CAMERAS AND ANCILLARY DEVICES

CROSS-REFERENCE TO RELATED APPLICATIONS

This patent application is a continuation of and claims priority to U.S. application Ser. No. 16/548,716 filed Aug. 22, 2019, now U.S. Pat. No. 11,546,498, which claims the benefit of U.S. Provisional Patent Application No. 62/722,813 filed Aug. 24, 2018, which applications are hereby incorporated by reference in their entirety.

FIELD

Systems, as disclosed herein, relate to and enable wireless user control, monitoring and operation of cameras and/or ancillary devices positioned a large distance apart and/or that are separated by one or more obstacles that impair wireless reception.

BACKGROUND

The use of wireless communications for controlling and monitoring the operation of another device is known and an example of this is the use of a remote control for the purpose of controlling another device such as a camera, camera platform or ancillary devices. Typically, the remote control is a user-operated device that emits a wireless signal that is capable of being received by the device being controlled. However, in such conventional wireless controlled systems the device being controlled must be within a designated distance from the control device, and with minimal obstructions or the wireless signal will not be received and will not operate to control the device.

The use of extenders is known in the art for increasing the operative distance between a wireless control device and the device to be wirelessly controlled. In an example, such extender may be in the form of hard cable and or device that is interposed between a receiver and a transmitter for respectively receiving a wireless signal emitted from the control device and sending the signal through the hard electrical cable to the receiver located near the device being controlled, wherein the transmitter emits a wireless control signal to be received by the device being controlled.

While such conventional wireless extender systems may be known, there is a need to provide not only a greater degree of control options to a user for the purpose of wirelessly controlling designated devices at a remote location, but the need to provide information regarding the device being controlled back to a user in a wireless manner so that each of the user and the device being controlled is freely movable and not hindered by the use of cables and the like. Further, in the area of camera device control, there are a great many operating features of camera devices and devices ancillary to the camera devices that would benefit from being able to be controlled by a user from a remote location, outside of the range of conventional wireless communications, in a manner that enable both the user and the camera devices to move freely without the restraints imposed by cabled communications connections.

It is, therefore, desired that a system be developed that enables the control of and/or feedback from camera devices and devices ancillary thereto by a user from a remote location outside of the range of conventional wireless communications in a wireless manner at both the user end and/or the camera device end. It is further desired that the system be configured in a manner that enables wireless communication of further information between the user and the camera so as to provide the user with an enhanced knowledge of real-time operational and/or location-aware information about the camera or other related devices.

SUMMARY

Systems, as disclosed herein for extending the transfer of signals for use with a camera device, comprise a first location station, wherein the first location station includes a first receiver. The first receiver is configured for receiving input of wireless signals from a user device, wherein the wireless signals are changed at the first location station to signals sent through a fiber optic cable from the first location station to a second location station. The first location station also includes a second receiver for receiving signals sent through the fiber optic cable from the second location station, wherein the signals from the fiber optic cable are changed at the first location station to wireless output signals from the first location station to a user device.

In an example embodiment, the system second location station comprises a third receiver for receiving signals sent through the fiber optic cable from the first location station, wherein the signals from the fiber optic cable are changed at the second location station to wireless output signals from the second location station to a camera device. The system second location comprises a fourth receiver for receiving input of wireless signals from the camera device, wherein wireless signals are changed at the first location station to signals sent through the fiber optic cable from the second location station to the first location station. In an example, the first and second locations stations are connected together by the fiber optic cable.

In an example, the wireless signals received at the first location station from the user device operate different features of a camera or devices ancillary to the camera. In an example, the different features are selected from the group consisting of camera lens features, camera color features, lighting features, camera position features, and combinations thereof. In an example, the first location station provides a video output signal received by the second location station from the camera device. In an example, the video output signal is sent to a view monitor for viewing. In an example, the first location station device receives wireless signals from a number of user devices. In an example, the second location station provides wireless signals to more than one camera device.

In an example, the system for extending wireless signals between first and second location stations comprises the first location station and the second location station. The first location station is positioned near a user who provides control signals using one or more wireless control devices, wherein the first location station processes the wireless signals and converts the signals for transmission from the first location station through a first end of a fiber optic cable. The second location station is positioned a distance from the first location station and near a camera device, wherein the second location station is connected with a second end of the fiber optic cable running between the first and second location stations, wherein the second location station converts the signal from the fiber optic cable to a wireless signal that is received by the camera device. The control signals operate to change features of the camera selected from the group consisting of lens features, color features, lighting features, camera position features, and combinations thereof. The second location station receives one or more wireless signals from the camera device or a device ancillary to the camera device that is converted for sending through the fiber optic cable to the first location station. The one or more wireless signals from the camera device or device ancillary to the camera device comprise information relating to the group consisting of operation information about the camera device, position information about the camera device, an audio signal proximate to the camera device, lighting information proximate to the camera device, a video signal from the camera device, and combinations thereof.

In such example, the second location station receives a video signal from the camera device and converts the signal for sending through the optic fiber cable to the first location station, and wherein the first location station provides video signal for viewing on a monitor. In an example, the video signal from the camera device is wireless. In an example, the second location station converts the signal from the fiber optic cable to more than one wireless signals that are received by more than one camera devices.

An example method, making use of systems as disclosed herein, for controlling features of a camera over a long distance between a user and the camera comprise operating a control device near the first location station to send a wireless signal from the control device to the first location station and converting the wireless signal for sending through a fiber optic cable connected to the first location station. The method also comprises receiving the signal sent through the fiber optic cable at the second location station that is positioned near a camera device and converting the signal to a wireless signal received by the camera device, wherein the received signal operates to change a feature of the camera. The method further comprises sending a video signal from the camera device to the second location station that is sent through the fiber optic cable, wherein the video signal is provided by the first control location to a video monitor for viewing near the first location station.

In an example, during the step of operating the control device, changing features of the camera device or ancillary devices of the camera device selected from the group consisting of camera lens features, camera operation settings, camera color features, lighting features, audio features, camera position, and combinations thereof. Also, during the step of operating, multiple wireless signals are sent by one or more control devices, and wherein during the step of receiving, converting the signal to multiple wireless signals received by multiple camera devices.

In an example, the method may further comprise the step of sending a wireless signal from the camera device to the second location station that is converted and sent through the fiber optic cable to the first location station and converted to a wireless signal and sent to a user device near the first location station. In an example, the wireless signal sent to a user device from the first location station comprises camera device information. In an example, the first and second location stations operate using different wireless networks.

BRIEF DESCRIPTION OF THE DRAWINGS

These and other features and advantages of wireless extender systems as disclosed herein will be appreciated as the same becomes better understood by reference to the following detailed description when considered in connection with the accompanying drawings wherein.

DETAILED DESCRIPTION

Systems as disclosed herein have been specifically developed for the purpose of enabling use of wireless devices for controlling camera devices and devices ancillary to camera devices between two points of long distances outside of the range of or in environments that impede the capabilities of conventional wireless devices such as devices that transmit and receive signals via technology for radio wireless local area networking of devices such as Wifi and the like. While the range of radio frequency signals may be extended by higher energy output and/or by higher gain antennas as a solution to distance and/or obstacle limitations, current legislation/regulations restrict the use of such higher energy output and/or higher gain antennas.

In an example, systems as disclosed herein enable a user to provide wireless control signals using a control device that emits wireless signals at a first location that is remote from a second location where one or more camera devices and ancillary devices are controlled by wireless control signals that are emitted from the second location, wherein the first and second locations are connected together by a cabled connection, e.g., using fiber optic cable and the like, permitting an extended range of transmissions of the signals between the first and second locations. Accordingly, it is to be understood that the term "camera device" as used herein may refer to a single camera or to multiple cameras arranged as desired to meet a particular end-use application, e.g., the camera device may be an array or cluster of multiple cameras.

In an example embodiment, systems as disclosed herein are configured to also enable multiple signals including ones that enable information from the second location to be wirelessly sent from the second location and transmitted through the cable to the first location where it is wirelessly transmitted to a user at the first location. Configured in this matter, systems as disclosed herein can operate to transparently facilitate two-way transmission of signals between the first and second locations over large distances through the use of a cable connection while enabling wireless communication of signals at each of the first and second locations to maximize a desired degree of mobility at each such location, e.g., between the user and the first location and between the camera devices and ancillary devices at the second location.

Figure 1:
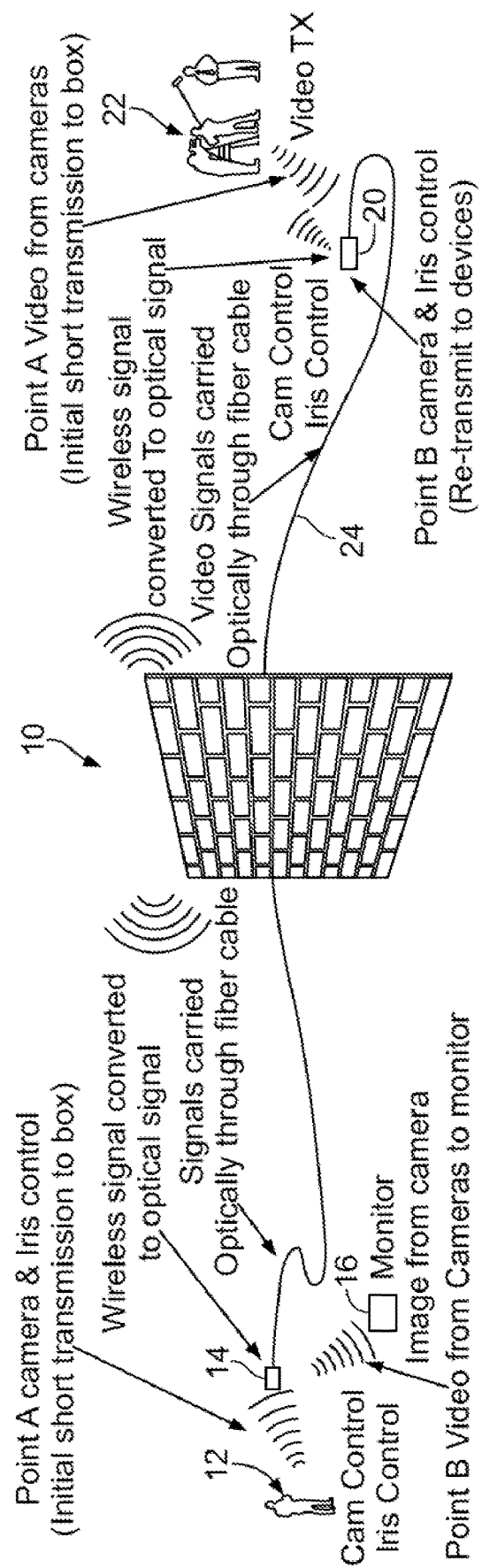
FIG. 1 is a schematic view of an example system as disclosed herein.

FIG. 1 illustrates an example system 10 as disclosed herein comprising a first location device or station 14 positioned at a location near a user, e.g., at Point A. As systems 10 as disclosed herein are designed for use with camera devices and ancillary devices used with a camera or at the location of the camera such as lighting, audio, and the like, the user will be operating one or more control or information devices 12 configured to provide a wireless output signal, e.g., using Wifi or the like, for controlling features of the camera devices such as lens feature, zoom, focus, iris, color, as well as the position of the camera. The position of the camera may include but not limited to the location of the camera along the x-axis and y-axis of a floor or other support surface relative to the region or object of interest being filmed or captured or live broadcast, and include the up and down tilt of the camera as well as the side movement of the camera. Additionally, systems as disclosed herein are configured to control camera position however a camera may be mounted or attached, including and not limited to motorized dollys and the like, and aerial movement devices such as drones or the like. A feature of systems as disclosed herein is that the one or more control devices are designed to enable a user to control, all through the use of one or more of the wireless control or information devices, all of such camera device features, thereby providing a desired degree of mobility to the user, which in some embodiments may comprise more than one user each using more than one wireless control device for wirelessly controlling the camera devices and ancillary devices.

In an example embodiment, the wireless control device can be a mobile/smart phone, tablet computer, laptop computer, desktop computer, motion control system or the like comprising an app and/or software configured to facilitate control of the camera features wirelessly, e.g., by Wifi communication with the first location station 14. In another example, the wireless control device can be a specific or dedicated controller configured to only provide wireless control of one or more features of the camera devices or ancillary devices.

In an example embodiment, the first location station 14 is positioned within wireless reception distance of the user to ensure that all wireless control signals emitted by the control device 12 operated by the user are received by the first location station 14 without unwanted reception issues, and also to ensure that all wireless signals transmitted from the first location station 14 are received by the user without any unwanted reception issues. As noted above, in an example embodiment, a feature of systems as disclosed herein is that they enable the transfer of camera device and ancillary device information, including and not limited to audio signals, video signals, and camera and ancillary device operating, motion and position information, back to the user by wireless transmission from the first location station 14.

As illustrated in FIG. 1, in an example, the first location station 12 is configured to emit a wireless signal containing camera control commands to be transmitted to the camera device 22 from a second location station 20 positioned within the wireless reception range of the camera 22. A video signal from the camera device 22, which wireless video signal is transmitted wirelessly to the second location station 20, is received at a monitor 16 wirelessly or via cable for viewing of the video by a user at Point A. In an example embodiment, such video signal may be provided by a cabled connection from the first location station 14 to the monitor 16. In an example embodiment, the first location station 12 is configured to emit a signal wirelessly containing an audio signal taken from a location proximate to the camera device, which wireless audio is received by a sound device including but not limited to an audio listening device, speakers, soundboard for desired processing, and/or a recording device for audio capture by a user at Point A. In an example embodiment, such audio signal may be provided by a cabled connection from the first location station 14 to the sound device.

Referring still to FIG. 1, the example system 10 comprises a second location device or station 20 that is positioned a far distance away from Point A, e.g., out of wireless reception from Point A, and near camera devices and/or ancillary devices 22 at Point B. The camera devices and ancillary devices 22 may be configured comprising one or more wireless transmitters or receivers, which may be part of the camera and ancillary devices or may be independent of the devices but operatively connected therewith, to enable adjustment of the features noted above in response to receiving a wireless control signal. The second location station 20 is configured to emit a wireless control signal therefrom to be received by such one or more wireless receivers to provide the desired control of the camera device and/or ancillary device features as initiated by the user at Point A. Additionally, in an example embodiment the camera devices and ancillary devices are be configured comprising one or more wireless transmitters, that may be part of or separate from the devices, that emit a wireless signal providing certain camera device or ancillary device information, which can include and not be limited to camera operation and position information, as wells as camera video, audio, and other information unique to Point B for the user or users at Point A to receive.

In an example embodiment, the first location station 14 at Point A and the second location station 20 at Point B are positioned a distance away from one another such that wireless signals emitted from the control devices by the user at Point A would not be received by the second location station, i.e., the first and second location stations are positioned out of wireless reception from wireless signals emitted at Point B and Point A, respectively. Alternatively, the placement positions of the first and second location stations may be out of reception from wireless signals emitted at respective Point B and Point A due to structural interference, e.g., one or more walls and/or one or more floors of a building or other type of structure.

Accordingly, systems as disclosed herein enable communication between the first and second location stations, wherein wireless transmission between Point A and Point B is not otherwise possible, through the use of a physical wire or cable 24 that is connected between the first and second location stations. In an example embodiment, the cable connection is a fiber optic cable that is configured to facilitate the transmission of information between the first and second location stations. In an example embodiment, the fiber optic cable is one having the following characteristics; a cable which contains either single or multiple internal fiber optic and/or copper strands in either single or multi-mode capable of carrying multiple, unique digital signals generated by multiple devices. The cable may be a military specification/tactical cable capable of withstanding impact or crushing force, e.g., being stepped on, or rolled over by vehicles. The connectors at each end may be the same and enable the user to have one point of connection for multiple devices. Currently, this cable is terminated (but not necessarily limited to) a Mini Expanded Beam style connector (MX) at each end. This connector can couple together with another connector allowing for two or more cables to be combined to extend the cable length if called for or desired.

The fiber optic cable is fitted with connectors at each end to facilitate attachment with complementary connectors of the first and second location stations. The system as configured in this matter, using fiber optic cable, facilitates fast transmission of information between first and second location stations that may be positioned distances apart from one another of greater than about 15 meters and up to about 10,000 meters. In an example application, systems as disclosed herein may be configured to facilitate information transmission using fiber optic cable of up to or greater than about 600 meters.

Because systems as disclosed herein may use fiber optic cable to facilitate transmission of the signals carried over the wireless carrier signals received at Point A and Point B, the first and second location stations are each configured to include converters that are configured to convert signals carried over wireless radio frequencies received at each respective location to optical signals or signals modulated on optical carrier signals and/or signals modulated on carrier wavelengths for transmission through the fiber optic cable, and converters that are configured to convert optical signals or signals derived from optical carrier signals or derived from carrier wavelengths taken from the fiber optic cable to be modulated into radio frequency signals for wireless transmission from the first and second location stations as necessary.

Figure 2:
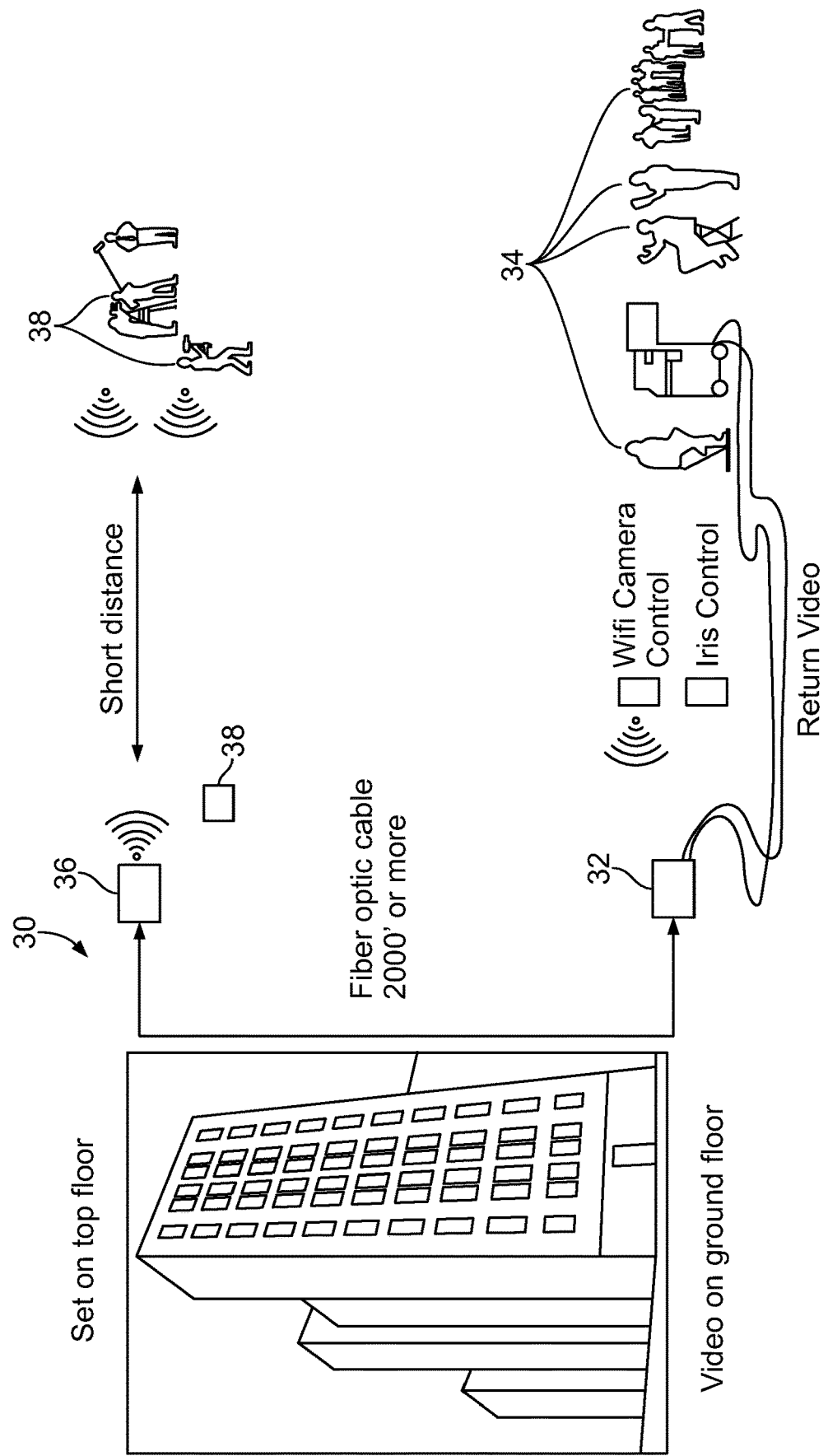
FIG. 2 is a schematic view of another example system as disclosed herein.

FIG. 2 illustrates an example embodiment of the system 30 as disclosed herein as used within a multi-floor building. In such embodiment, the first location device or station 32 positioned at Point A near one or more users 34 having one more wireless control devices on one level of the building, e.g., on the ground floor or a lower floor, and the second location device or station 36 is positioned at Point B near the camera device and/or ancillary device 38 on another level of the building, e.g., on the top floor or an upper floor. This example is provided to illustrate how wireless communication between Points A and B may not be possible due to structural interference (or legal radio emission limitations), and how the system as disclosed herein making use of the fiber optic connection between the first and second location stations operates to extend the ability for wireless communication between Points A and B. In such example, the fiber optic cable may extend up to 600 meters or more as called for by the particular end-use application.

Also illustrated in FIG. 2 are example control devices at Point A for purposes of example and reference being in the form of a wireless, e.g., Wifi, camera control including and not limited to an iris control. It is to be understood that the control device or control devices used at Point A are the same as those discussed above with reference to FIG. 1 to control features of the camera device and/or ancillary devices. FIG. 2 also illustrates that at Point B the camera device and/or ancillary devices transmitting a wireless signal to the second location station 36, and the second location station emitting a wireless signal to the camera device and/or ancillary device. As noted above, the example illustrated in FIG. 2 is provided for the purpose of showing use of the system within a building where wireless interference between Point A and Point B is caused by a building structure, and not necessarily purely distance issues. It is to be understood that the system illustrated in FIG. 2 is not intended to be limiting, and may be configured to include all of the features discussed above for the purposes of receiving and transmitting different types of information between Points A and B.

Figure 3:
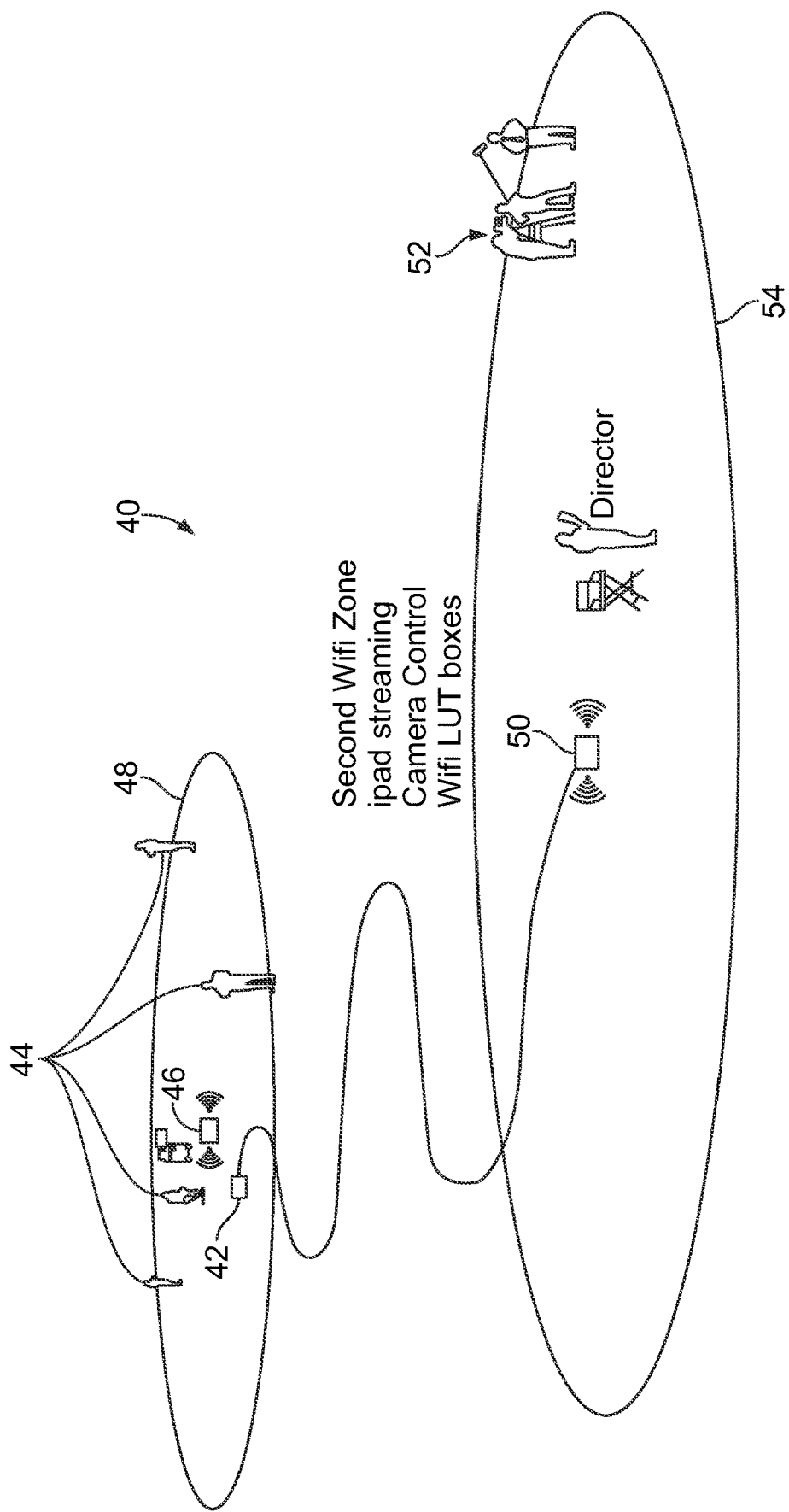
FIG. 3 is a schematic view of another example system as disclosed herein.

FIG. 3 illustrates an example embodiment of the system 40 as disclosed herein as used over a long distance between Points A and B. In such embodiment, the first location device or station 42 positioned at Point A near one or more users 44 having one more wireless control devices 46. In this particular example, the first location station 42 is positioned within the reception range of a first Wifi zone 48. The second location device or station 50 is positioned at Point B a distance away from the first location station 42 near the camera device and/or ancillary device 52. In this particular example, the second location station 50 is positioned outside of the first Wifi zone 48 and within the reception range of a second Wifi zone 54. This example is provided to illustrate how the system may operate using two different Wifi reception zones. In such example, the fiber optic cable may extend up to 600 meters or more as called for by the particular end-use application. It is to be understood that the system illustrated in FIG. 3 is not intended to be limiting, and may be configured to include all of the features discussed above for the purposes of receiving and transmitting different types of information between Points A and B.

Figure 4:
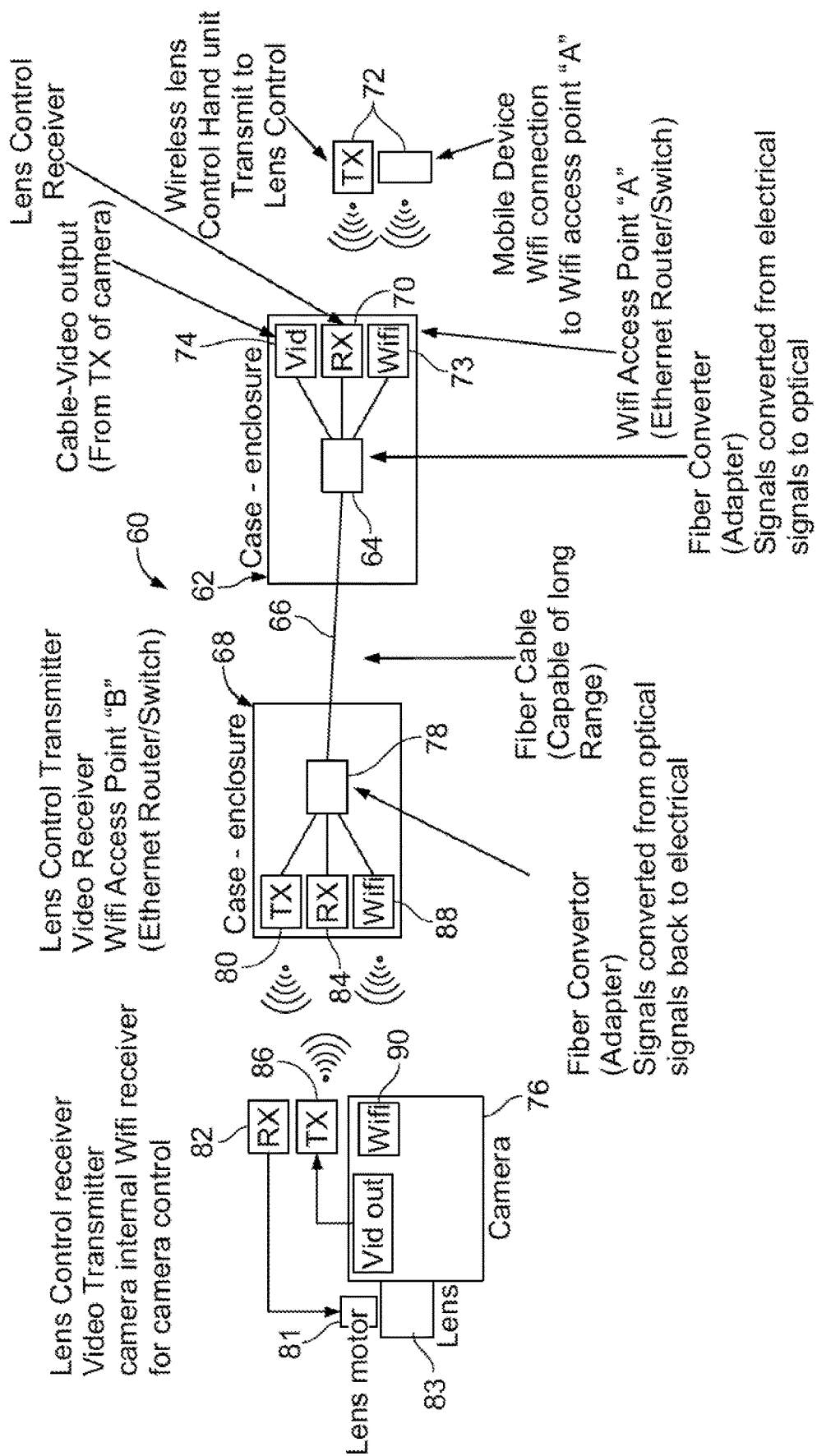
FIG. 4 is a schematic view of example components used in an example system as disclosed herein.

FIG. 4 illustrates an example system 60 disclosed herein and some of the components used therewith. The system 60 comprises a first location device or station 62 that as noted above is placed at one location, e.g., Point A in wireless proximity to a user. The first location station 62 comprises a housing that is sized to accommodate a number of components therein. In an example, one of the components is converter or converters or adapters 64 configured for attachment with one end of a fiber optic cable 66, and that converts electrical signals to optical signals for transmission by the fiber optic cable to a second location device or station 68. The converters 64 may be a two-way converter that additionally is configured to convert optical signals coming from the second location station 68 to electrical signals, thereby enabling two-way communications between the first and second location stations. Alternatively, the first location station 62 may comprise multiple converters, wherein one converter operates to convert electrical signals to optical signals, and a second converter operates to convert optical signals to electrical signals.

The first location station 62 includes comprises a wireless receiver 70 configured to receive a wireless signal from one or more wireless user control devices 72. In an example embodiment, the wireless user control device 72 is wirelessly connected with a Wifi access point 73 at Point A. The wireless receiver 70 receives the wireless signal from the user control devices 72 and converts it to an electric signal that is directed to the converter 64. The first location station 62 may also include a transmitter that is configured to convert an electrical signal from the converter 64 to a Wifi or radio frequency signal that is sent to one or more of the user control devices 72. Alternatively, the first location station may comprise a transmitter/receiver that is configured to provide two-way conversion of the electrical signal to wireless signals and wireless signals to electrical signals. The first location station 62 comprises an Ethernet Router 73 or the like that enables connection of the first location station with a Wifi network to provide the Wifi access point at Point A to enable the transmission and receipt of wireless information between the first connection station 62 and the user control devices 72.

The first location station 62 comprises a video output device 74 that receives an electronic signal from the converter 64 and converts it to a video signal for connection with a monitor for viewing of the video image by a user. In one example, the video output device may be configured having a cable output for wired connection with the monitor. Additionally, or alternatively, the video output device 74 may be configured to provide a wireless signal to be received by a monitor for viewing the video image wirelessly.

This is just an example of components that may be included within the first location station 62, and it is to be understood that other similar or different components may be included depending on the particular end-use system requirements. For example, there may be additional receivers and/or transmitters and/or converters useful facilitating desired back and forth communication of various information signals between the first location station and a user, and it is to be understood that all such additional components within the intended scope of this description.

The second location station 68 placed is at one location, e.g., Point B, distant from Point A and in wireless proximity to one or more camera devices and/or ancillary devices 76. The second location station 68 comprises a housing that is sized to accommodate a number of components therein. In an example, one of the components is converter or adapter 78 that is configured for attachment with an end of the fiber optic cable 66 opposite the first location station, and that converts optical signals received from the first location station to electrical signals. The converter 78 may be a two-way converter that additionally is configured to convert electrical signals coming from other components in the second location station to optical signals for directing to the first location station, thereby enabling two-way communication of information between the first and second location stations. Alternatively, the second location station 68 may comprise two converters, wherein one converter operates to convert electrical signals to optical signals, and a second converter operates to convert optical signals to electrical signals.

The second location station 68 includes a wireless transmitter 80 configured to receive an electrical signal from the converter 78 and generate a wireless signal emitted from the second location station for reception by one or more wireless receivers 82 of the camera device and/or ancillary device to control one or more features of the same in accordance with the control input provided by the user at Point A. In the example embodiment illustrated, the wireless receiver 82 is configured to change a feature of a camera lens, e.g., zoom, focus, iris, through the use of a motor 81 operatively attached to the camera lens 83. However, it is to be understood that systems as disclosed herein may be configured comprising one or more wireless receivers configured to control other features of the camera device and/or ancillary device as described above.

The second location station 68 also includes a wireless receiver 84 for receiving wireless signals transmitted by one or more wireless transmitters 86 associated with the camera devices and/or ancillary devices. The wireless receiver 84 converts a wireless signal received to an electrical signal that is directed to the converter 78 for transmission through the fiber optic cable 66 and to the first location station 62. As noted above, instead of separate wireless transmitters and receivers, the second location station may comprise a single wireless transceiver configured to enable two-way wireless communication between the second location station and the camera devices and/or ancillary devices. In an example embodiment, the wireless receiver 84 receives a wireless signal transmitted by a wireless transmitter 86 associated with the camera device for purposes of transmitting a video image from the camera device 76 to the second location position. However, it is to be understood that systems as disclosed herein may be configured comprising one or more wireless transmitter configured to transmit other information relating to the camera devices and/or ancillary devices as discussed above including and not limited to camera and/or ancillary device setting information, camera and/or ancillary device position information, as well as timing signals, audio signals, video signals, and motion control and feedback signals.

The second location station 68 also comprises a Ethernet Router 88 or the like that enables connection of the second location station with a Wifi network to provide the Wifi access point at Point B to enable the transmission and receipt of wireless signals between the second first location station 68 and the camera devices and/or ancillary devices 76. In the embodiment illustrated, the camera device 76 comprises an internal Wifi receiver 90 for providing camera control through the wireless signals sent from the second location station 68.

This is just an example of components that may be included within the second location station 68, and it is to be understood that other similar or different components may be included depending on the particular end-use system requirements. For example, there may be additional receivers and/or transmitters and/or converters used for facilitating desired back and forth communication of various information signals between the second location station and the camera devices and/or ancillary devices, and it is to be understood that all such additional components are within the intended scope of this description.

Figure 5:
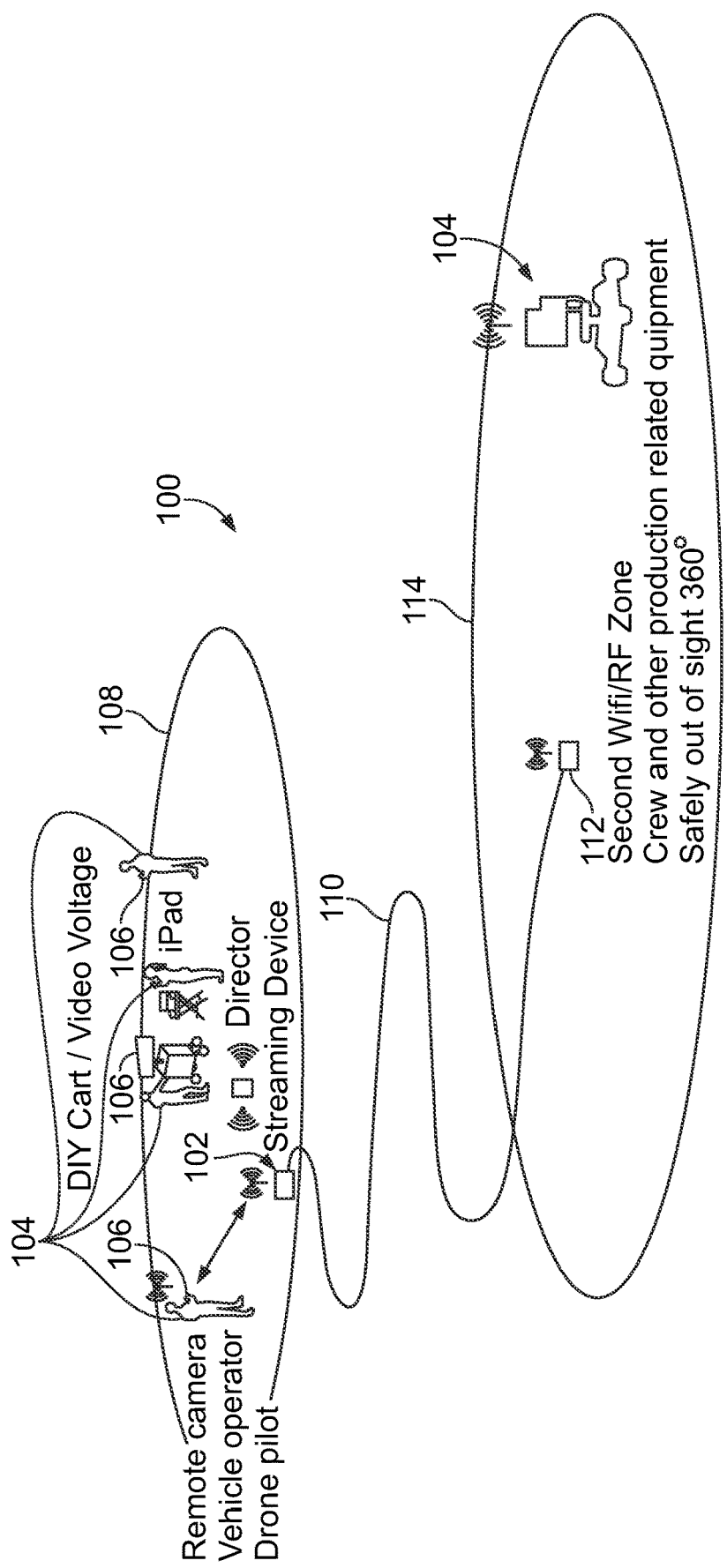
FIG. 5 is a schematic view of another example system as disclosed herein.

FIG. 5 illustrates an example embodiment of the system 100 as disclosed herein as used over a long distance between Points A and B. In such embodiment, the first location device or station 102 is positioned at Point A near one or more users 104 having one more wireless control and/or monitoring devices 106. In this particular example, the first location station 102 is positioned within the reception range of a first Wifi zone 108, and the first location station 102 operates to receive and transmit wireless signals to and from the one or more user control and/or monitoring devices 106. The second location device or station 112 is connected with the first location device by fiber optic cable 110 and is positioned at Point B a distance away from the first location station 102 near the camera device and/or ancillary device 104. In this particular example, the second location station 112 is positioned outside of the first Wifi zone 108 and within the reception range of a second Wifi zone 114, and wherein the camera device and/or ancillary devices being controlled and/or monitored at Point B may be a camera device on a movable/motorized dolly or the like. Further, FIG. 5 illustrates that there are no cables or operators near the camera device 104 at Point B. In such example, the fiber optic cable may extend up to 600 meters or more as called for by the particular end-use application. It is to be understood that the system illustrated in FIG. 5 is not intended to be limiting, and may be configured to include all of the features discussed above for the purposes of receiving and transmitting different types of information between Points A and B.

Figure 6:
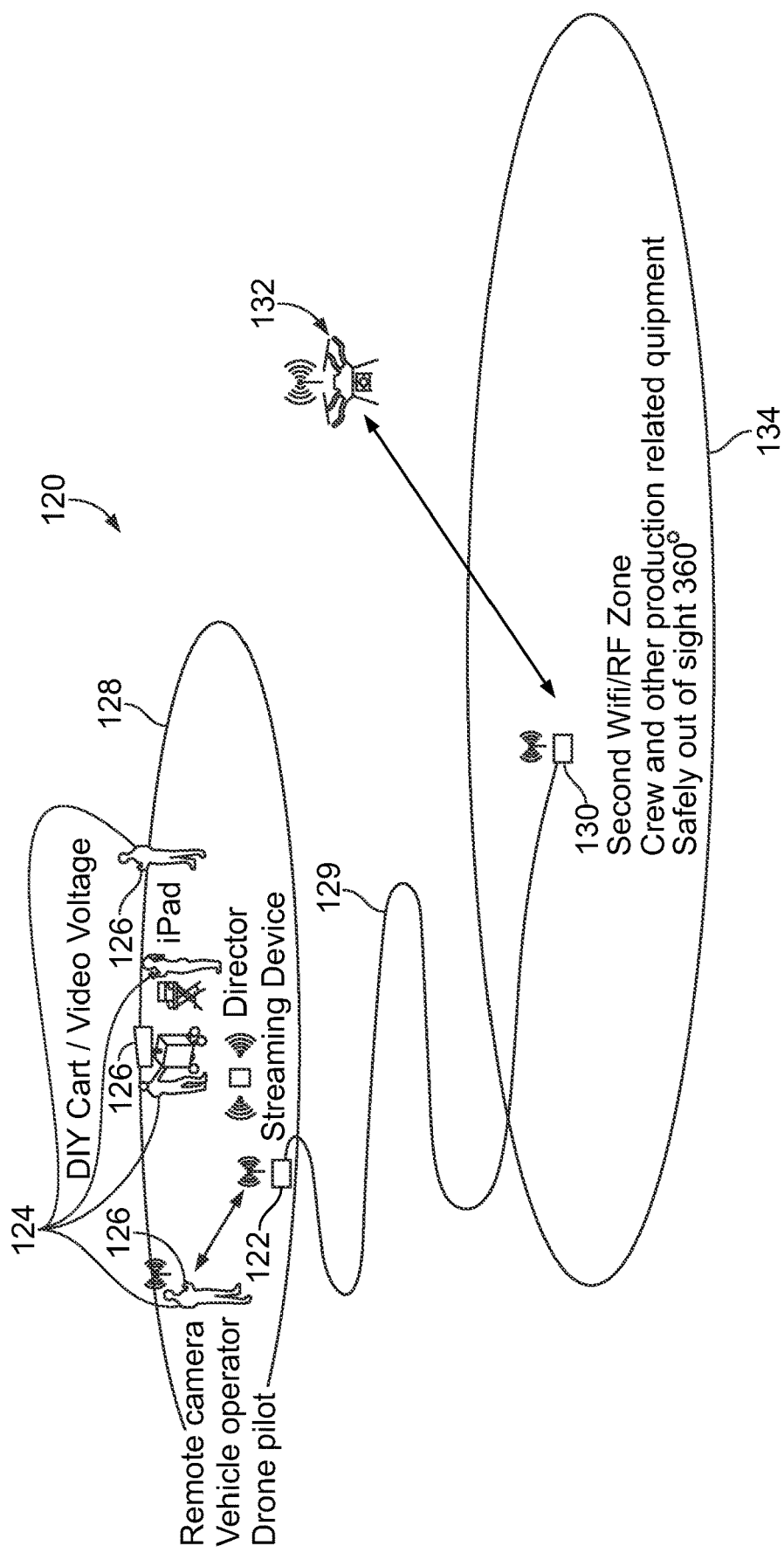
FIG. 6 is a schematic view of another example system as disclosed herein.

FIG. 6 illustrates an example embodiment of the system 120 as disclosed herein as used over a long distance between Points A and B. In such embodiment, the first location device or station 122 is positioned at Point A near one or more users 124 having one more wireless control and/or monitoring devices 126. In this particular example, the first location station 122 is positioned within the reception range of a first Wifi zone 128, and the first location station 122 operates to receive and transmit wireless signals to and from the one or more user control and/or monitoring devices 126. The second location device or station 130 is connected with the first location device by fiber optic cable 129 and is positioned at Point B a distance away from the first location station 122 near the camera device and/or ancillary device 132. In this particular example, the second location station 130 is positioned outside of the first Wifi zone 128 and within the reception range of a second Wifi zone 134, and wherein the camera device and/or ancillary devices being controlled and/or monitored at Point B may be a camera device on drone or other aerial movable device.

Further, FIG. 6 illustrates that there are no cables or operators near the camera device 132 at Point B. In such example, the fiber optic cable may extend up to 600 meters or more as called for by the particular end-use application. It is to be understood that the system illustrated in FIG. 6 is not intended to be limiting, and may be configured to include all of the features discussed above for the purposes of receiving and transmitting different types of information between Points A and B.

Figure 7:
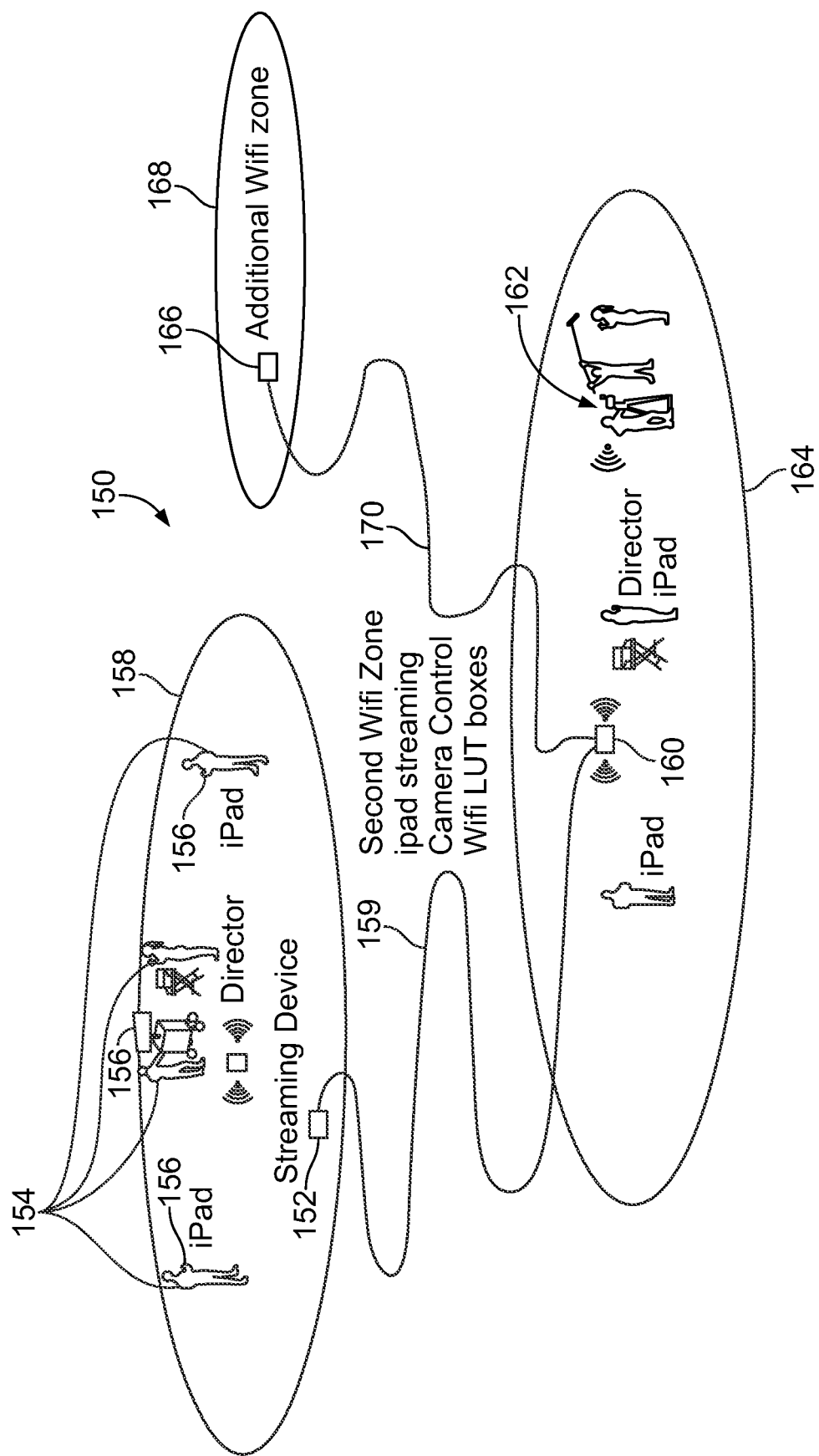
FIG. 7 is a schematic view of another example system as disclosed herein.

FIG. 7 illustrates an example embodiment of the system 150 as disclosed herein as used over a long distance between Points A and B, and that includes a further Wifi zone associated with a further location station remote from Points A and B. In such embodiment, the first location device or station 152 is positioned at Point A near one or more users 154 having one more wireless control and/or monitoring devices 156. In this particular example, the first location station 152 is positioned within the reception range of a first Wifi zone 158, and the first location station 152 operates to receive and transmit wireless signals to and from the one or more user control and/or monitoring devices 156. The second location device or station 160 is connected with the first location device by fiber optic cable 110 and is positioned at Point B a distance away from the first location station 152 near the camera device and/or ancillary device 162. In this particular example, the second location station 160 is positioned outside of the first Wifi zone 158 and within the reception range of a second Wifi zone 164, and wherein the camera device and/or ancillary devices being controlled and/or monitored at Point B may be any type of camera device and/or ancillary device previously described herein.

Further, FIG. 7 illustrates an embodiment comprising an additional location station 166 within a further Wifi zone 168 that is outside of the Wifi zones 158 and 164. The additional location station 166 in this example is connected with the second location station 160 by fiber optic cable 170. This example is provided to illustrate how systems as disclosed herein may comprise more than two location stations, wherein the one or more additional location stations may be connected in series and/or in parallel with another location station by fiber optical cable connection for the purpose of addressing a particular end-use application calling for wireless control and/or monitoring of further equipment, which may be camera devices and/or ancillary devices or other, outside of the two existing Wifi zones, thereby enabling a further degree of flexibility and scaling of systems as disclosed herein to wirelessly control and/or monitor camera devices and/or ancillary devices or equipment in multiple Wifi zones through the use of fiber optic cable connection.

It is to be understood that the system illustrated in FIG. 7 is not intended to be limiting, and may be configured to include all of the features discussed above for the purposes of receiving and transmitting different types of information between Points A, Points B, and any number of additional points as called for by a particular end-use application. For example, such system 150 may be configured to enable one or more users at Point B within Wifi zone 164 to now control one or more camera devices and/or ancillary devices in one or more an additional location outside of Wifi zone 164, e.g., in Wifi zone 168 in this example.

Figure 8:
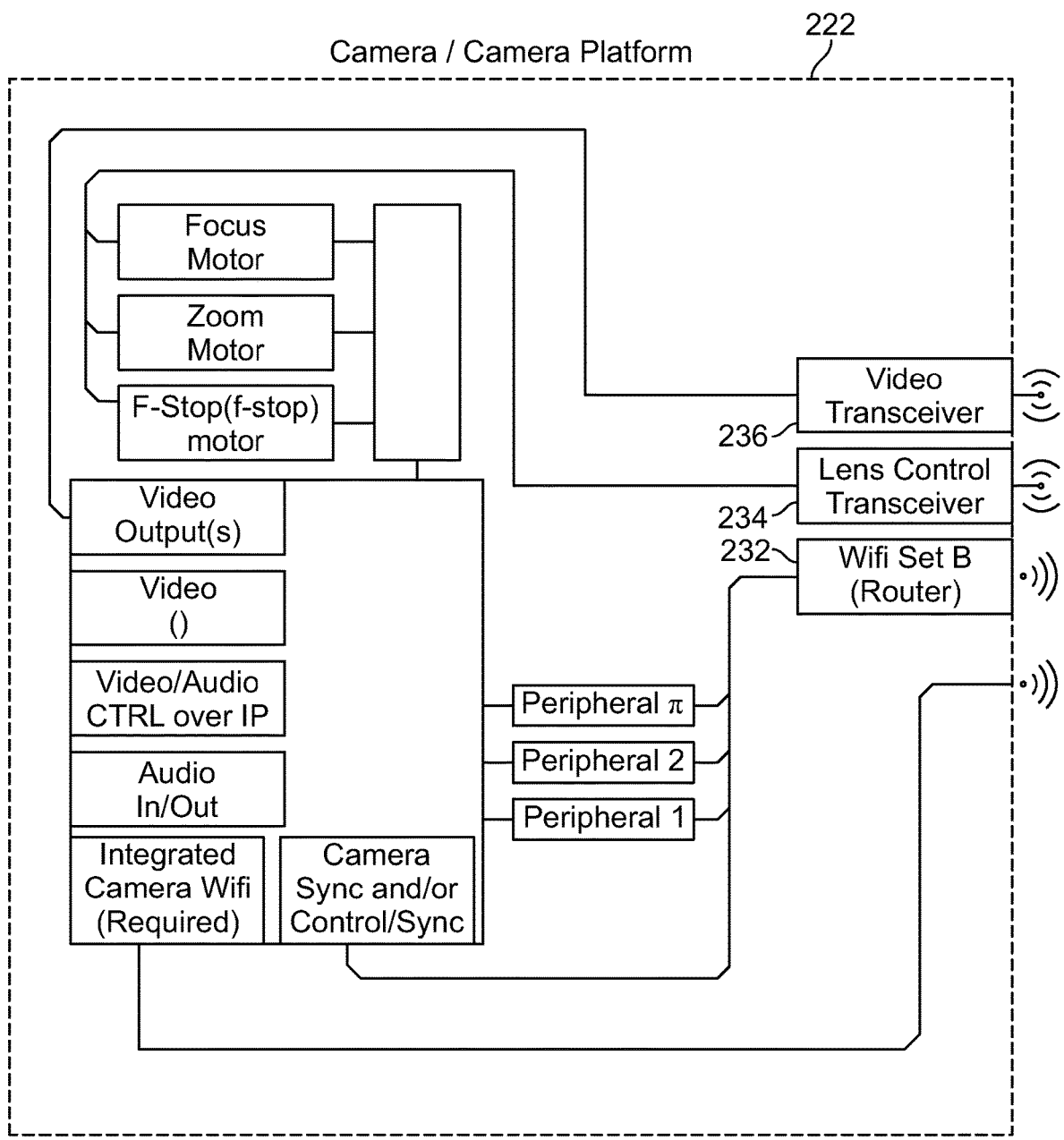
FIG. 8 is a schematic view of example components used in an example system as disclosed herein.
Figure 8:
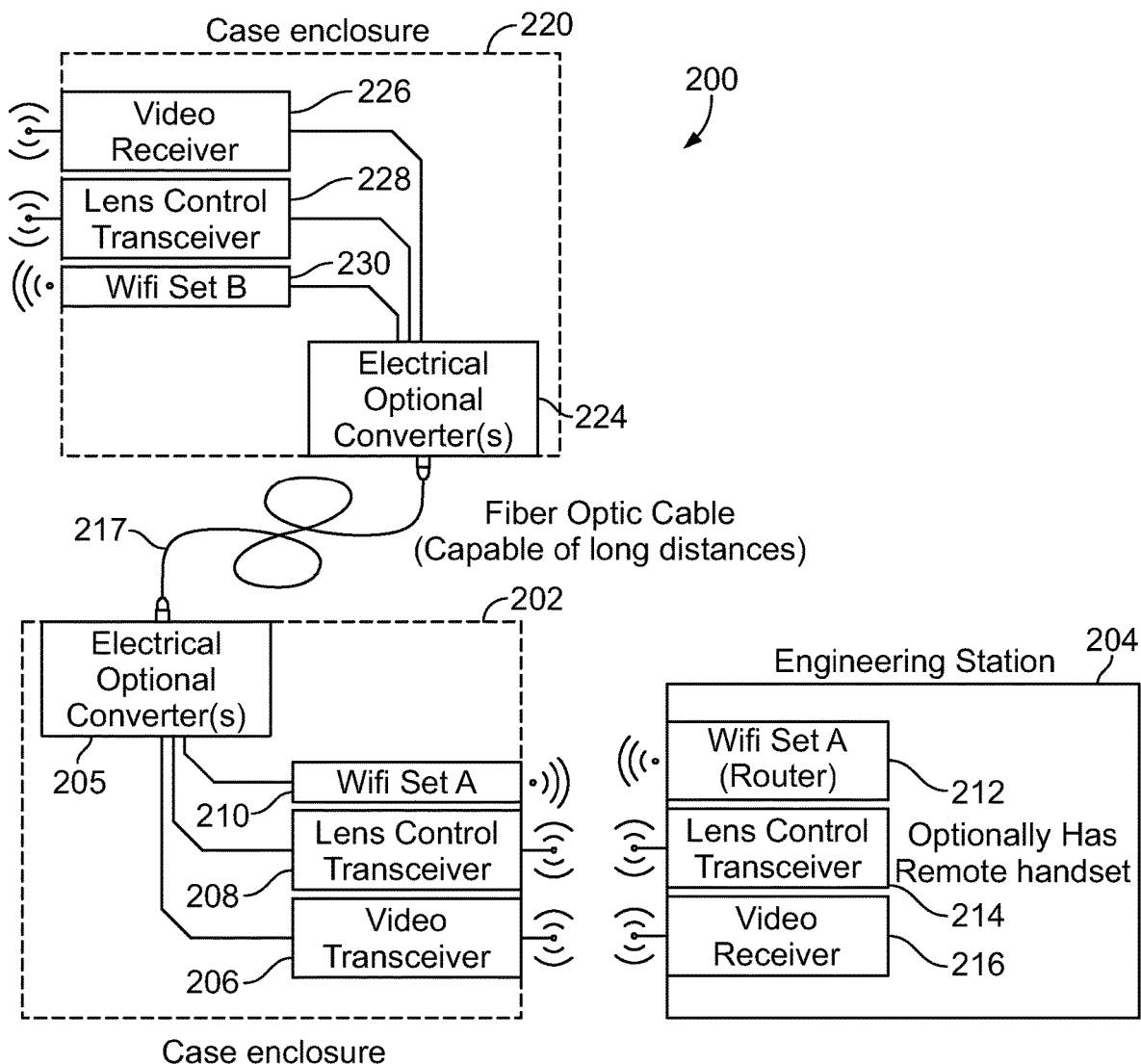

FIG. 8 illustrates an example system 200 disclosed herein and some of the components used therewith, and is somewhat similar to the example system disclosed above and illustrated in FIG. 4. The system 200 comprises a first location device or station 202 positioned at one location, e.g., Point A, in wireless proximity to one or more users that operate one or more wireless control devices 204, which may be embodied as an engineering station, a handheld device, or the like. The first location station 202 comprises a housing sized to accommodate a number of components therein, which include an electrical/optical converter 205, a wireless video transmitter 206, a wireless lens control/monitor transceiver 208 and a Wifi connection device 210. The wireless control device 204 comprises a Wifi Router 212, a wireless lens control/monitor transceiver 214, and a wireless video receiver 216. Configured in this manner, the first location station 202 and control device 204 facilitate communication of information between one another wirelessly. The converter 205 operates to convert one or more optical signals passing through a fiber optic cable 217 to electrical signals coming and going through the remaining components within the first location station 202.

The system 200 comprises a second location device or station 220 positioned at one location, e.g., Point B, in wireless proximity to a camera device and/or ancillary device 222. The second location station 220 comprises a housing sized to accommodate a number of components therein, which include an electrical/optical converter 224, a wireless video receiver 226, a wireless lens control/monitor transceiver 228 and a Wifi connection device 230. The converter 224 operates to convert one or more optical signals passing through the fiber optic cable 217 to electrical signals coming and going through the remaining components within the second location station 220. The camera device 222 comprises a Wifi Router 232, a wireless lens control/monitor transceiver 234, and a wireless video receiver 236. Configured in this manner, the second location station 220 and camera device 222 facilitate communication of information between one another wirelessly. In this example embodiment, the system is configured to control and monitor such camera lens features as focus, zoom and T-stop via associated actuators or the like, and additionally may be used to control a number of different camera peripheral devices or features.

Figure 9:
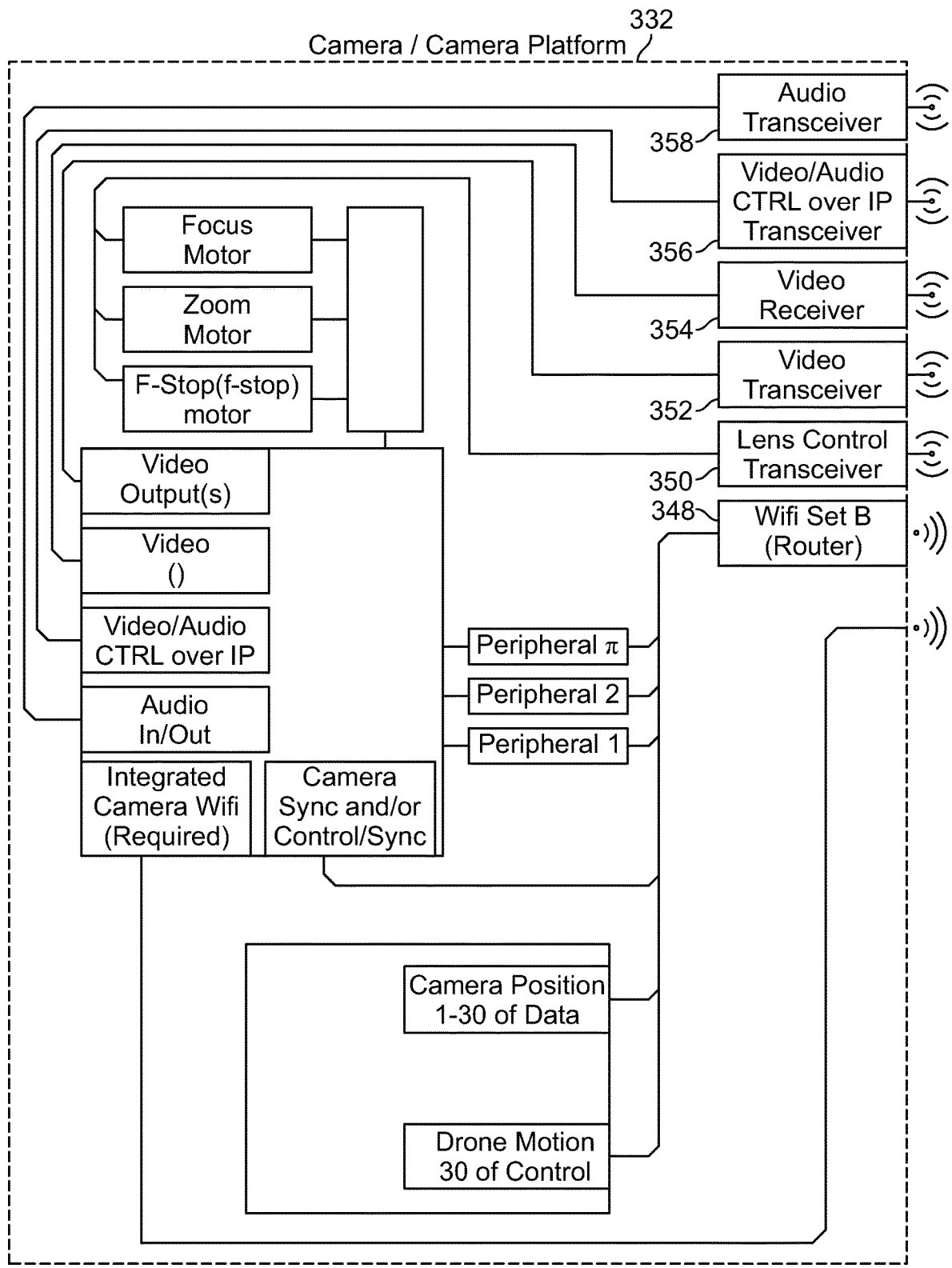
FIG. 9 is a schematic view of example components used in an example system as disclosed herein.
Figure 9:
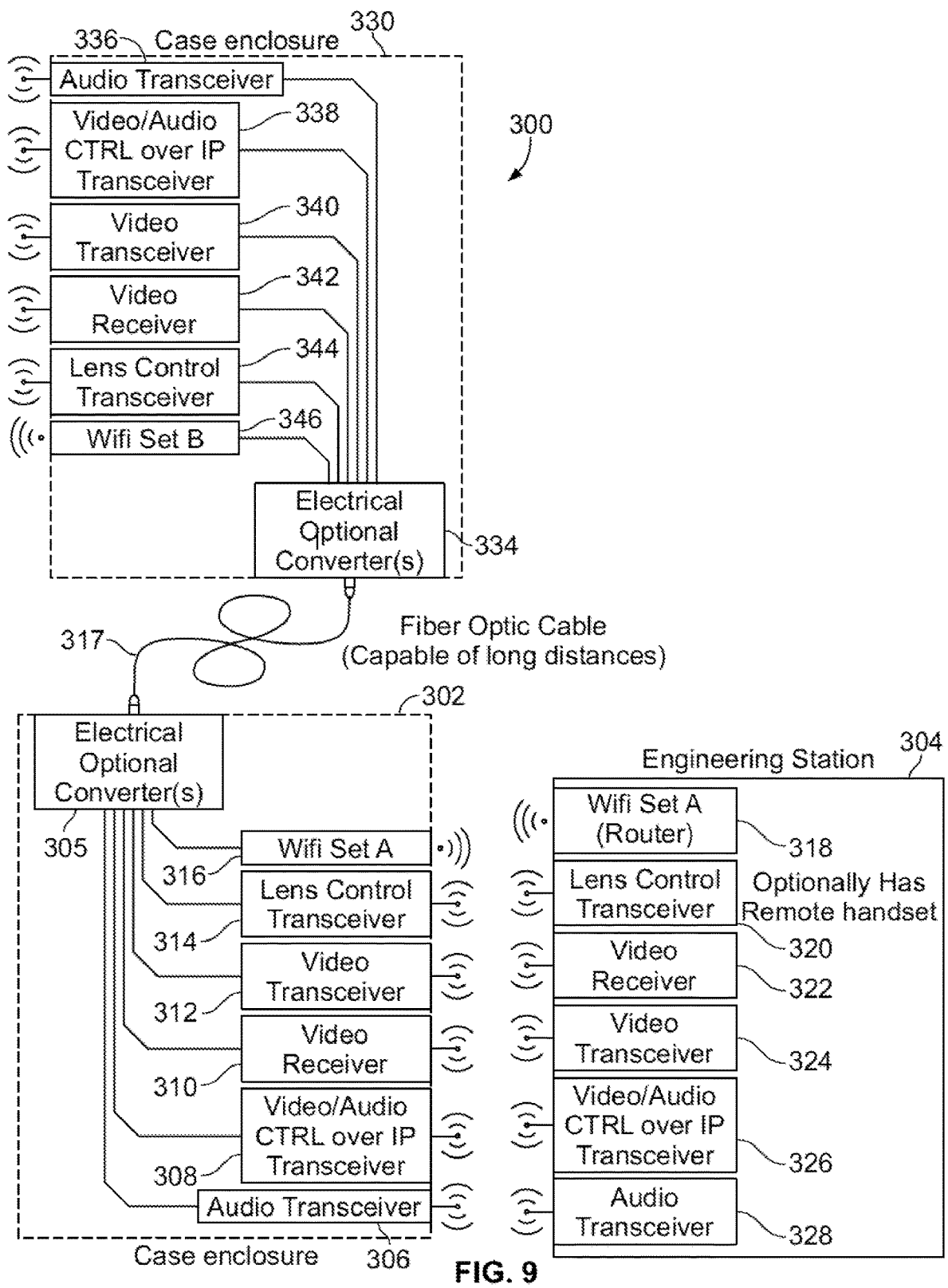

FIG. 9 illustrates an example system 300 disclosed herein and some of the components used therewith, and is somewhat similar to the example system disclosed above and illustrated in FIG. 8. However, this example system is additionally configured to control camera device movement and enable video/audio control. The system 300 comprises a first location device or station 302 positioned at one location, e.g., Point A, in wireless proximity to one or more users that operate one or more wireless control devices 304, which may be embodied as an engineering station, a handheld device, or the like. The first location station 302 comprises a housing sized to accommodate a number of components therein, which include an electrical/optical converter 305, a wireless audio transceiver 306, a wireless video/audio control/monitor over IP transceiver 308, a wireless video receiver 310, a wireless video transmitter 312, a wireless lens control/monitor transceiver 314, and a Wifi connection device 316. The wireless control device 304 comprises a Wifi Router 318, a wireless lens control/monitor transceiver 320, a wireless video receiver 322, a wireless video transmitter 324, a wireless video/audio control/monitor over IP transceiver 326, and a wireless audio transceiver 328. Configured in this manner, the first location station 302 and control device 304 facilitate communication of information between one another wirelessly. The converter 305 operates to convert one or more optical signals passing through a fiber optic cable 317 to electrical signals coming and going through the remaining components within the first location station 302.

The system 300 comprises a second location device or station 330 positioned at one location, e.g., Point B, in wireless proximity to a camera device and/or ancillary device 332. The second location station 330 comprises a housing sized to accommodate a number of components therein, which include an electrical/optical converter 334, a wireless audio transceiver 336, a wireless video/audio control/monitor over IP transceiver 338, a wireless video transmitter 340, a wireless video receiver 342, a wireless lens control/monitor transceiver 344, and a Wifi connection device 346. The converter 334 operates to convert one or more optical signals passing through the fiber optic cable 317 to electrical signals coming and going through the remaining components within the second location station 330. The camera device 322 comprises a Wifi Router 348, a wireless lens control/monitor transceiver 350, a wireless video transmitter 352, a wireless video receiver 354, a wireless video/audio control/monitor over IP transceiver 356, and a wireless audio transceiver 358. Configured in this manner, the second location station 320 and camera device 322 facilitate communication of information between one another wirelessly. In this example embodiment, the system is configured to control and monitor such camera lens features as focus, zoom and T-stop via associated actuators or the like, and additionally may be used to control a number of different camera peripheral devices or features. Further such system may be used to control and/or monitor camera movement including and not limited to camera head mount movement and/or camera motion movement, e.g., on a motorized or otherwise movable dolly and the like.

Figure 10:
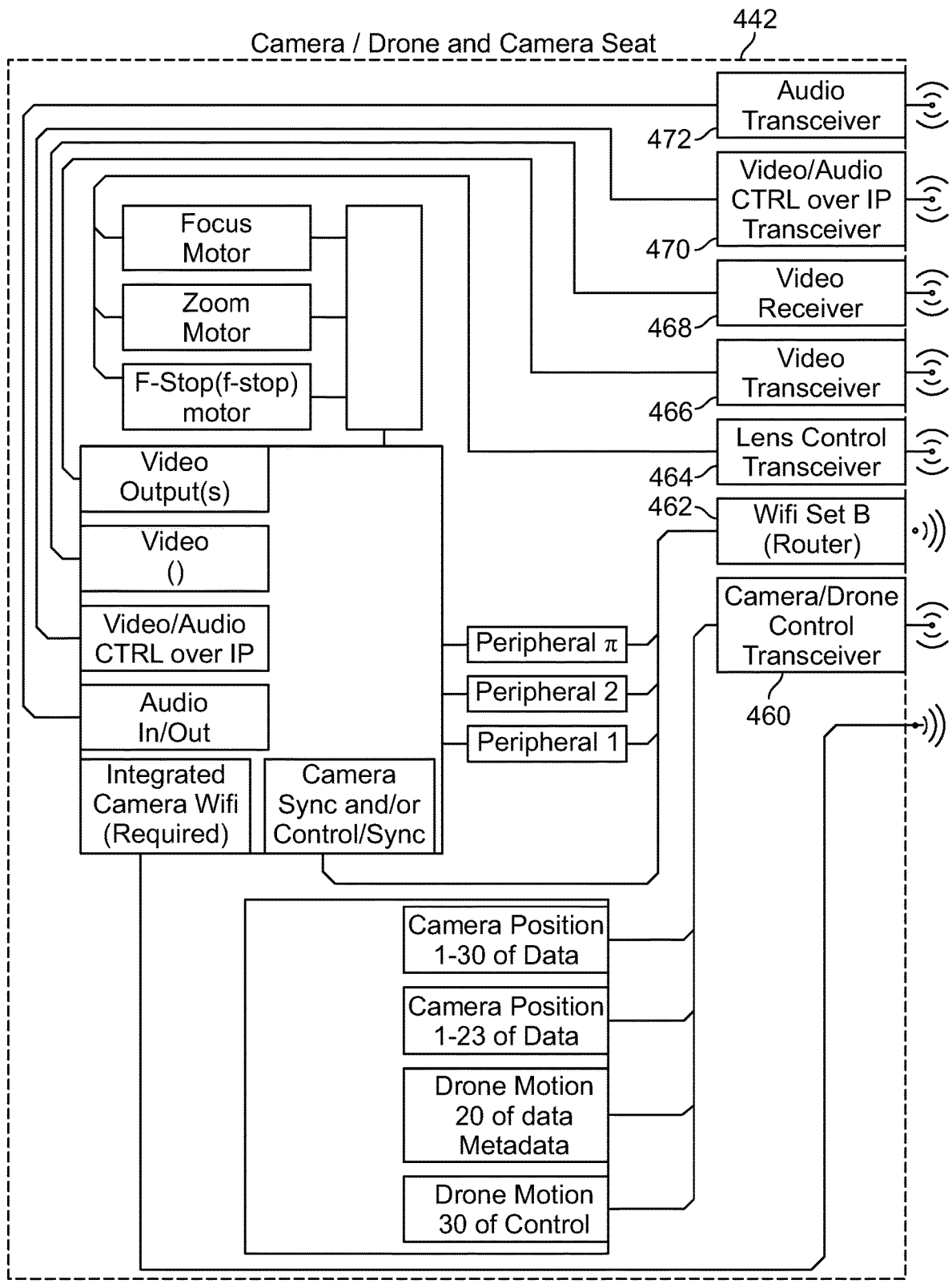
FIG. 10 is a schematic view of example components used in an example system as disclosed herein.
Figure 10:
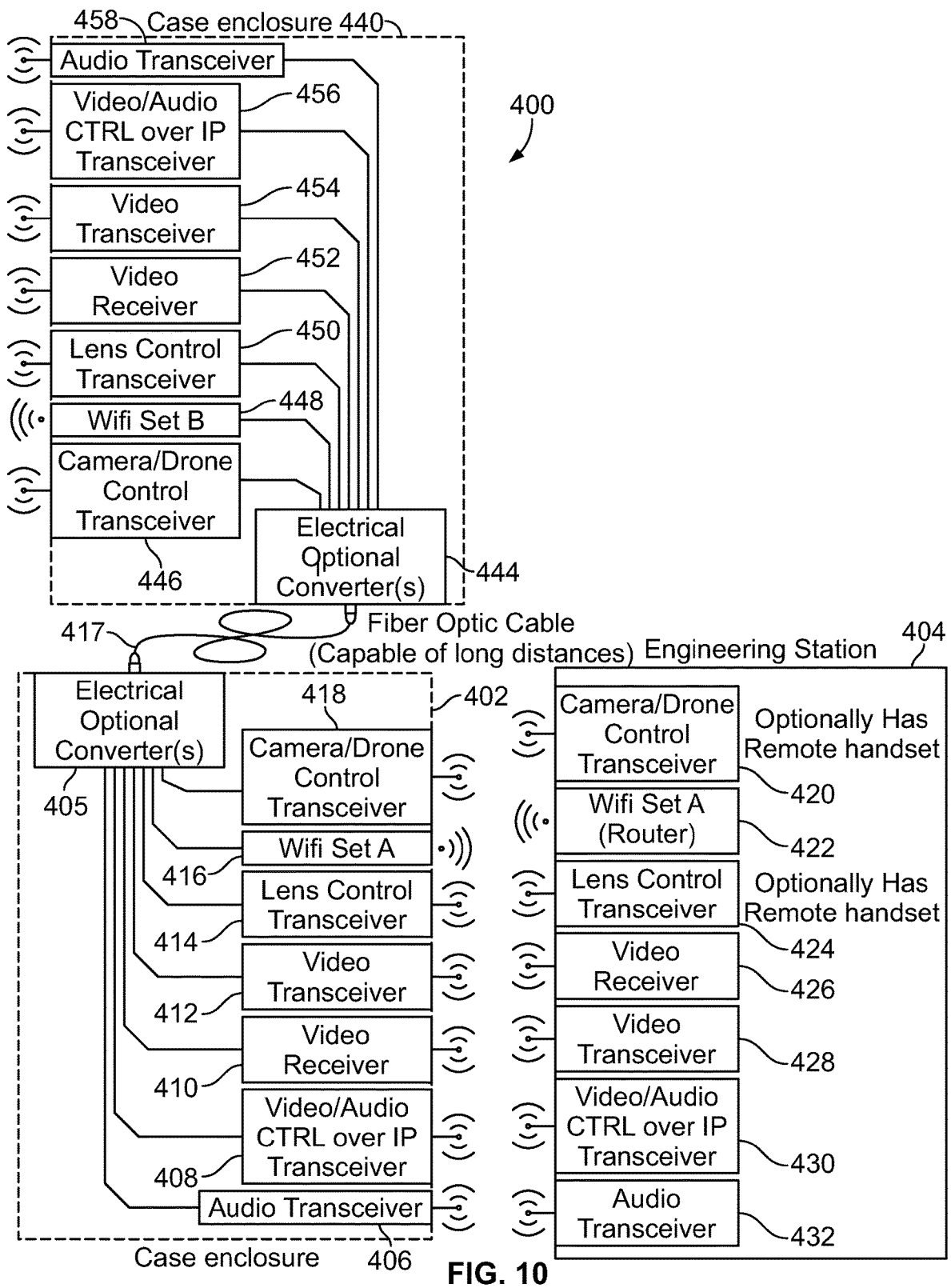

FIG. 10 illustrates an example system 400 disclosed herein and some of the components used therewith, and is somewhat similar to the example system disclosed above and illustrated in FIG. 9. However, this example system is additionally configured to aerial control camera device movement, e.g., as mounted to a drone or the like. The system 400 comprises a first location device or station 402 positioned at one location, e.g., Point A, in wireless proximity to one or more users that operate one or more wireless control devices 404, which may be embodied as an engineering station, a handheld device, or the like. The first location station 402 comprises a housing sized to accommodate a number of components therein, which include an electrical/optical converter 405, a wireless audio transceiver 406, a wireless video/audio control/monitor over IP transceiver 408, a wireless video receiver 410, a wireless video transmitter 412, a wireless lens control/monitor transceiver 414, a Wifi connection device 416, and a wireless camera/drone control/monitor transceiver 418. The wireless control device 404 comprises a wireless camera/drone control/monitor transceiver 420, a Wifi Router 422, a wireless lens control/monitor transceiver 424, a wireless video receiver 426, a wireless video transmitter 428, a wireless video/audio control/monitor over IP transceiver 430, and a wireless audio transceiver 432. Configured in this manner, the first location station 402 and control device 404 facilitate communication of information between one another wirelessly. The converter 405 operates to convert one or more optical signals passing through a fiber optic cable 417 to electrical signals coming and going through the remaining components within the first location station 402.

The system 400 comprises a second location device or station 440 positioned at one location, e.g., Point B, in wireless proximity to a camera device and/or ancillary device 442, e.g., a drone. The second location station 440 comprises a housing sized to accommodate a number of components therein, which include an electrical/optical converter 444, a wireless camera/drone control/monitor transceiver 446, a Wifi connection device 448, a wireless lens control/monitor transceiver 450, a wireless video receiver 452, a wireless video transmitter 454, a wireless video/audio control/monitor over IP transceiver 456, and a wireless audio transceiver 458. The converter 444 operates to convert one or more optical signals passing through the fiber optic cable 417 to electrical signals coming and going through the remaining components within the second location station 440. The camera device and/or ancillary device 442 comprises a wireless camera/drone control/monitor transceiver 460, a Wifi Router 462, a wireless lens control/monitor transceiver 464, a wireless video transmitter 466, a wireless video receiver 468, a wireless video/audio control/monitor over IP transceiver 470, and a wireless audio transceiver 472. Configured in this manner, the second location station 440 and camera device and/or ancillary device 442 facilitate communication of information between one another wirelessly. In this example embodiment, the system is configured to control and monitor such camera lens features as focus, zoom and T-stop via associated actuators or the like, and additionally may be used to control a number of different camera peripheral devices or features. Further such system enables wireless control of camera movement including and not limited to camera position and drone motion.

In an example embodiment, systems as disclosed herein are specially configured to enable one or more users (operating one or more wireless control and/or monitoring devices at one location remote from the camera devices and/or ancillary devices) to control and/or monitor certain features of the camera devices and/or ancillary devices (wirelessly so that the camera devices and/or ancillary devices are free to move unhindered by cable attachment). Use of the first and second location stations as disclosed in conjunction with the fiber optic cable connecting the two enables such operation over large distances or between obstacles that would cause a loss of reception making wireless communication between the two locations difficult if not impossible.

Thus, a features of such system include the ability to both control camera devices and ancillary devices features and receive setting, position, and other desired information from the camera devices and/or ancillary devices from a remote location through the use of wireless devices that would otherwise not be possible given the relative location of user to the camera device and/or ancillary device. A further feature is the ability to configure the system as desired depending on the type of camera device and/or ancillary device user control, monitoring, and or other information or data/signal treatment desired. For example, having real-time settings of the camera devices and/or ancillary devices may or may not be desirable depending on the user control equipment and/or software that is being used.

For purposes of evaluating the video image being captured by the camera and/or the audio being captured through the use of microphones near the camera, systems as disclosed herein are configured to provide a video image to the user who may choose to change a camera setting or a setting or an ancillary device as desired to arrive at the desired image. As noted above, this may include user control of color correction devices using the system that operates to change one or more colors of the video image captured by the camera. Additionally, audio received by the user through the system may be recorded or sent to a soundboard or the like for desired treatment. These are but a few examples intended to be within the scope of systems as disclosed herein.

Further, it is to be understood that systems as disclosed herein may be configured to enable one or more users from Point A to wirelessly control more than one remotely located camera devices and/or ancillary devices at Point B. In such embodiment, the first and second location stations are equipped having the necessary wireless transmitters and receivers to enable such wireless control of such multiple camera devices and/or ancillary devices. Still further, systems as disclosed herein are not limited to use at only two locations or points, and it is to be understood that systems as disclosed herein may comprise more than two location stations for the purpose of facilitating communication between control devices and camera devices and/or ancillary devices in more than two different Wifi zones, wherein location stations used in such manner may be connected by fiber optic cable in parallel and/or in series as called for by the particular end-use application.

Although but a few example embodiments of systems have been described in detail above, those skilled in the art will readily appreciate that many modifications are possible in the example embodiments without materially departing from this invention. For example, systems as disclosed herein have included use of fiber optic cable between first and second location stations. It is to be understood that other types of cables capable of transmitting signals over larges distances may be used with systems as disclosed herein. To the extent that fiber optic cable is not used, then it is understood that other elements of the system will be configured as needed to accommodate the use of such other types of cables. Additionally, it is to be understood that systems as disclosed herein may be used with all types of camera devices such as movie cameras, video cameras, and other cameras used to capture video images that are either recorded or live broadcast. These are but a few examples of modifications of systems as disclosed herein that are intended to be within the scope of the disclosure.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for extending the transfer of signals for use with a camera and a device ancillary to the camera, wherein the camera and the device ancillary to the camera are freely movable, the system comprising:
   a first case enclosure that is positionable in wireless proximity to a freely movable user operating a user device, wherein the user device comprises a Wifi router, wherein the first case enclosure comprises a Wifi connection device and one or more converters for receiving a wireless control signal produced by the user device outside of the first case enclosure and producing a control optical signal transmitted through an optical cable extending from the first case enclosure; and
   a second case enclosure that is positionable remotely from the first case enclosure and that is in wireless proximity to the freely movable camera and the device ancillary to the camera, wherein the camera comprises a Wifi router, wherein the optical cable extends between the first case enclosure and the second case enclosure, wherein the second case enclosure comprises a Wifi connection device and one or more converters for receiving the control optical signal from the first case enclosure and providing a wireless control signal that is used to control a feature of the camera and the device ancillary to the camera located outside of the second case enclosure;
   wherein the second case enclosure is configured to receive a wireless video output signal from the camera and convert the wireless video output signal to an optical video signal that is transmitted through the optical cable to the first case enclosure; and
   wherein the first case enclosure is configured to receive the optical video signal transmitted through the optical cable and convert the optical video signal to a video signal that is transmitted to a video monitor located proximate to the first case enclosure for viewing the video output from the camera.

2. The system of claim 1, wherein each of the first and second case enclosures are configured to facilitate positionability relative to the respective freely movable user and the freely movable camera.

3. The system of claim 1, wherein the first case enclosure is positionable to enable connection with a first wireless access point, and wherein the second case enclosure is positionable to enable connection with a second wireless access point that is the same or different than the first wireless access point.

4. The system of claim 1, wherein the second case enclosure is configured to receive an audio signal from an audio device outside of the second case enclosure that is configured to capture audio proximate to the camera device, and wherein the one or more converters in the second case enclosure convert the audio signal to an audio optical signal transmitted through the optical cable to the first case enclosure.

5. The system of claim 1, wherein the first case enclosure is configured to receive an audio/video control signal provided by a controller outside of the first case enclosure, and wherein the one or more converters in the first case enclosure convert the audio/video control signal to an audio/video optical signal transmitted through the optical cable to the second case enclosure.

6. A system for extending transmission of signals between two geographically remote locations for use with a freely movable user at a first location and a freely movable camera and a device ancillary to the camera at a second location, the system comprising:
   a first case enclosure located at the first location, wherein the first case enclosure is configured to facilitate positionability in wireless proximity to the freely movable user, the first case enclosure comprising a Wifi connection device and a receiver for receiving a wireless control signal from a controller operated by the user outside of the first case enclosure, wherein the controller comprises a Wifi router, wherein the receiver provides an output electrical control signal that is converted to an optical signal and transmitted through an optical cable that extends outwardly from the first case enclosure; and
a second case enclosure located at the second location, wherein the second case enclosure is configured to facilitate positionability in wireless proximity to the freely movable camera and the device ancillary to the camera, wherein the second case enclosure is connected to the first case enclosure by the optical cable, the second case enclosure comprising a Wifi connection device and a converter that converts the optical signal produced by the first case enclosure to an electrical control signal that is connected with a transmitter that transmits the control signal wirelessly to the freely movable camera and the device ancillary to the camera that is located outside of the second case enclosure, wherein the camera comprises a Wifi router.

7. The system of claim 6, wherein the second case enclosure includes a receiver for receiving a signal from the second location that is converted to an optical signal and sent to the first case enclosure by the optical cable.

8. The system of claim 7, wherein the signal from the second location is one or both of a video signal and an audio signal.

9. The system of claim 7, wherein the first case enclosure includes a transmitter for transmitting the signal received from the second location to a device located outside of the first case enclosure at the first location.

10. The system of claim 7, wherein the first case enclosure is positionable at the first location to enable wireless connection with a first wireless access point, and wherein the second case enclosure is positionable at the second location to enable connection with a second wireless access point that is the same or different from the first wireless access point.

11. A method for allowing a freely movable user having a user device at a first location to control a feature of a freely movable camera and a device ancillary to the camera at a second location that is geographically remote from the first location geographically, the method comprising the steps of:
transmitting a wireless control signal from the user device at the first location to a first case enclosure that is configured to be positionable in wireless proximity to the freely movable user and converting the control signal within the first case enclosure at the first location to an optical signal, wherein the user device comprises a Wifi router and the first case enclosure comprises a Wifi connection device;
transmitting the optical signal through an optical cable extending from the first case enclosure to the second location;
converting the optical signal by a second case enclosure that is configured to be positionable in wireless proximity to the freely movable camera and the device ancillary to the camera, wherein the second case enclosure is connected with the optical cable at the camera location, wherein the camera comprises a Wifi router and the second case enclosure comprises a Wifi connection device; and
wirelessly transmitting the control signal from the second case enclosure to the freely movable camera and the device ancillary to the camera that is outside of the second case enclosure at the camera location.

12. The method of claim 11, wherein the step of transmitting a wireless control signal comprises the freely movable user operating the user device to provide the control signal, wherein first case enclosure comprises a receiver that receives the wireless control signal and produces an and electrical signal, and wherein the first case enclosure comprises a converter that converts the electrical signal to the optical signal.

13. The method of claim 11, wherein the step of converting is performed by a converter in the second case enclosure that receives the optical signal and converts the optical signal to an electrical signal.

14. The method of claim 13, wherein the step of wirelessly transmitting the control signal from the second case enclosure is performed by a transmitter in the second case enclosure that receives the electrical signal produced by the converter in the second case enclosure and transmits the control signal outwardly from the second case enclosure.

15. The method of claim 11, wherein the first case enclosure is positionable to enable connection with a first wireless access point, wherein the second case enclosure is positionable to enable connection with a second wireless access point that is the same or different from the first wireless access point.

\* \* \* \* \*